(12) United States Patent
Navon

(10) Patent No.: US 7,995,067 B2
(45) Date of Patent: Aug. 9, 2011

(54) CYCLICAL IMAGE BUFFER

(75) Inventor: Mois Navon, Efrat (IL)

(73) Assignee: Mobileye Technologies Limited, Nicosia (CY)

( * ) Notice: Subject to any disclaimer, the term of this patent is extended or adjusted under 35 U.S.C. 154(b) by 1125 days.

(21) Appl. No.: 11/692,941

(22) Filed: Mar. 29, 2007

(65) Prior Publication Data

US 2008/0239393 A1 Oct. 2, 2008

(51) Int. Cl.
*G09G 5/39* (2006.01)
*G09G 3/36* (2006.01)
*G09G 3/20* (2006.01)
*G06F 13/00* (2006.01)

(52) U.S. Cl. .......... 345/531; 345/530; 345/536; 345/56; 345/100

(58) Field of Classification Search .................. 345/537, 345/539, 530–532, 536, 56, 100
See application file for complete search history.

(56) References Cited

U.S. PATENT DOCUMENTS

| 4,694,405 | A | * | 9/1987 | Bradbury et al. | ............ 358/1.11 |
| 5,131,740 | A | * | 7/1992 | Maekawa | ...................... 356/3.14 |
| 5,224,213 | A | | 6/1993 | Dieffenderfer et al. | |
| 6,337,578 | B2 | * | 1/2002 | Jefferson et al. | ................ 326/38 |
| 7,038,689 | B2 | | 5/2006 | Willis | |

* cited by examiner

*Primary Examiner* — Hau H Nguyen

(57) ABSTRACT

A storage buffer attached to an image processor for stereo image processing. The processor compares a first image and a second image. The storage buffer stores image data of the second image. The storage buffer includes: a data-shifting-hardware mechanism which while the processor compares a patch of the first image to a swath of the second image, the data shifting mechanism using hardware within the storage buffer shifts at least a portion of the swath within the storage buffer. The data-shifting hardware mechanism includes preferably digital multiplexers with respective selectable inputs from adjacent and non-adjacent columns of data within the storage buffer and selectable inputs from adjacent rows of data within the storage buffer.

8 Claims, 8 Drawing Sheets

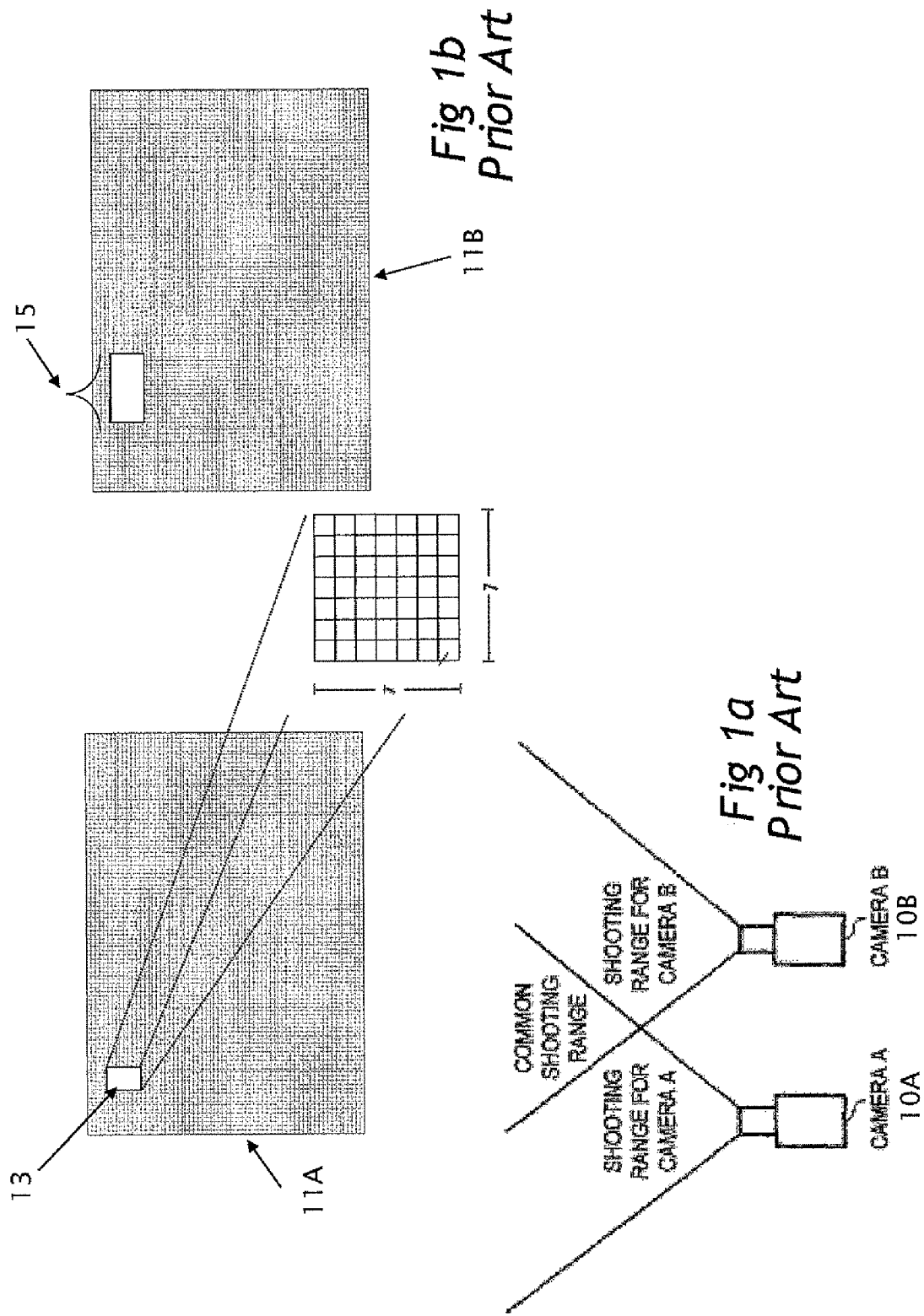

CYCLICAL IMAGE BUFFER

FIELD AND BACKGROUND OF THE INVENTION

The present invention relates to data storage and in particular an efficient data buffer for use in a stereo image processing system which maximizes processing speed by reducing the number of accesses to the data buffer.

Image processing is conventionally performed by reading an image or a portion thereof into a memory device, e.g. RAM. The image data is accessed from the memory device by the image processor or circuitry for the image processing. Typically, image processing applications access the same picture elements, or pixels, multiple times, and the speed of the image processing is limited by the large number of required accesses to the memory device, independent of the speed or efficiency of the actual processing. Thus, the processing circuitry generally waits while data required for the processing is being retrieved from the memory. One approach used to address this problem is a double buffer, sometimes referred to as a "ping-pong" buffer. A "ping-pong" buffer is disclosed in U.S. Pat. No. 5,224,213 by Dieffenderfer et al. The ping-pong data buffer mechanism which transfers data from one data bus to another data bus includes a dual-port storage mechanism having a single storage array and two independent ports with each port having its own separate data, address and control lines. Write circuitry is coupled to one of the independent ports for receiving data from one of the data buses and storing it into a first portion of the storage array. Read circuitry is coupled to the other of the independent ports for simultaneously reading data from a second portion of the storage array and supplying it to the other data bus. Mode control logic is provided for enabling the storing and reading functions of the first and second portions of the storage array to be interchanged back and forth from time to time so that data may be read from one portion while data is being stored into the other portion and vice versa. The ping-pong buffer scheme provides one buffer for processing the current tasks while a second identical buffer is used to retrieve the next batch of data for processing. When both data retrieval and processing have completed their current tasks, the buffers are swapped such that newly retrieved data is used for processing and the old processing data is now overwritten with the next batch of data from memory. Although the ping-pong buffer scheme increases throughput and improves processing time, the ping-pong buffer scheme doubles the in-circuit storage and associated circuitry, since two full image portions are stored variations of the ping-pong buffer scheme for image processing applications have been disclosed in U.S. Pat. No. 7,038,689 by Willis.

Thus there is a need for a very efficient data buffer scheme which both minimizes the required amount of hardware, while at the same time provides a means for maximum processing throughput. Such a scheme can be achieved by noting a unique characteristic of the data processed in stereo imaging.

The term "stereo imaging" as used herein refers to the processing of images being input from two cameras focused on the same scene or object. Processing of "stereo imaging" is primarily though not exclusively concerned, with matching a patch of data from one camera (e.g. right-hand camera) with a corresponding image patch from the companion camera (e.g. left-hand camera). The patch and the corresponding patch both include images of the same object from slightly differing perspectives. The matching of the images allows calculation of disparity between the image patches which may be used to accurately calculate distance to the object based on known quantities such as the focal length of the camera lens and the distance between the cameras. The terms "moving" and "shifting" data are used herein interchangeably.

SUMMARY OF THE INVENTION

According to the present invention there is provided a method, in a system including an image processor attached to a storage buffer, for comparison between first image data and second image data. A patch of the first image data is compared to a swath of the second image data. The storage buffer stores the swath of the second image data. During the comparison, the swath is shifted using a hardware mechanism within the storage buffer. The storage buffer typically includes columns of data, numbered from zero to N. The shifting includes, upon each clock cycle of the processor: (i) moving data from column one into column N; and (ii) for n columns one to N, moving data from column n to column n−1. The patch is typically compared to corresponding sized patches within the swath M times, wherein M is less than N, and upon completing the comparison to the swath, at least N−M+1 columns of data are moved (or shifted) in a single step using the hardware mechanism. A multi-shift of groups of data columns is performed within the storage buffer to allow for new alignment of the next needed swath. Upon completing the comparison to the swath, a portion, e.g. one or two columns of the second image data is shifted into the storage buffer from a preferably small second storage buffer using a similar hardware mechanism thus readying the second swath in the storage buffer. The second storage buffer preferably includes at least one column of image data, the height of the columns being equal to the height of the swath.

According to the present invention there is provided, a storage buffer attached to a processor. The processor compares a first image and a second image. The storage buffer stores image data of the second image. The storage buffer includes: a data-shifting-hardware mechanism which, while the processor compares a patch of the first image to a swath of the second image. The data shifting mechanism using hardware within the storage buffer shift at least a portion of the swath within the storage buffer. The data-shifting hardware mechanism includes preferably digital multiplexers with respective selectable inputs from typically adjacent columns of data within the storage buffer and selectable inputs from adjacent rows of data within the storage buffer. The digital multiplexers preferably include selectable inputs from at least one non-adjacent consecutive columns of data within the storage buffer.

According to the present invention there is provided a system for processing stereo images including a first image from a first camera and a second image from a second camera. A storage buffer is attached to a processor. The processor compares a first image and a second image. The storage buffer stores image data of the second image. The storage buffer includes a data-shifting-hardware mechanism which while the processor compares a patch of the first image to a swath of the second image, the data shifting mechanism using hardware within the storage buffer shifts at least a portion of the swath within the storage buffer. A second preferably small storage buffer is operatively attached to the storage buffer providing an extension to it which allows for data for the next swath to be stored. Upon completing the comparison between the patch of the first image and the swath of the second image, new data comprising a second swath is shifted into the storage buffer using a similar data-shifting-hardware mechanism attached between the storage buffer and the second storage buffer. The second storage buffer preferably includes no more than two columns of data. A pixel alignment unit is preferably attached to the storage buffer which inputs two consecutive words from a memory unit and aligns the two consecutive words to a single word. The pixel alignment unit is typically attached to the second storage buffer.

BRIEF DESCRIPTION OF THE DRAWINGS

The invention is herein described, by way of example only, with reference to the accompanying drawings, wherein:

FIG. 1a is a prior art drawing of a conventional stereo camera configuration;

FIG. 1b is a schematic drawing of two images illustrating a patch and a swath, respectively, in two images and a comparison thereof in stereo processing of the images, according to an embodiment of the present invention;

FIG. 1c is a drawing showing the overlap of adjacent swaths of data, according to an embodiment of the present invention

FIG. 5B is an illustration of the shifting of data with each clock cycle, according to the regular mode of operation; and FIG. 5C is an illustration of the shifting of data with each clock cycle, according to an enhanced mode of operation.

DESCRIPTION OF THE PREFERRED EMBODIMENTS

Figure 2:
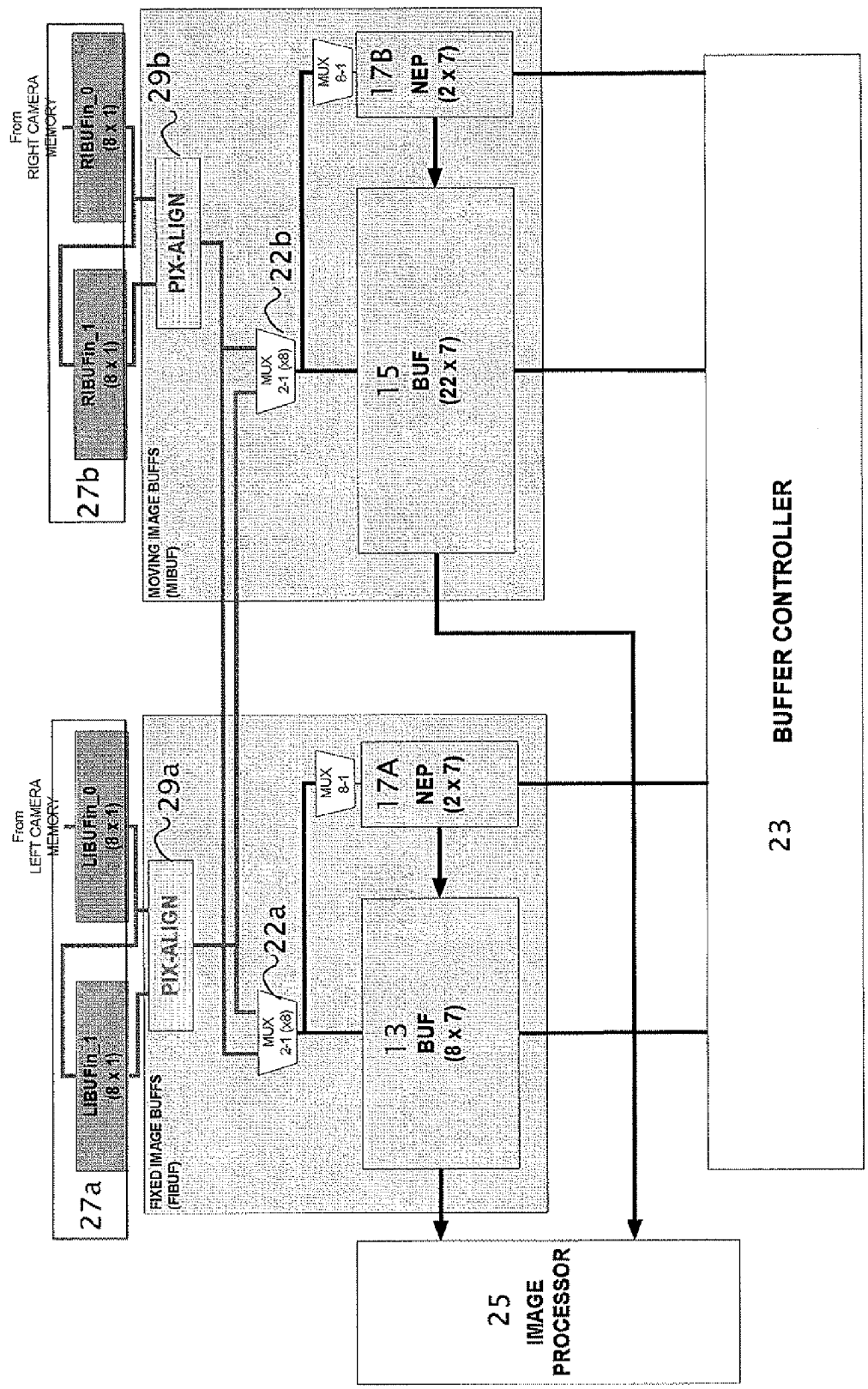
FIG. 2 is a drawing according to an embodiment of the present invention of buffering for stereo image processing hardware.

The present invention is of a system and method for efficiently storing and shifting stored data to be effected by shifting data stored within a data buffer for maximizing efficiency of stereo image processing while minimizing requisite hardware.

The principles and operation of a system and method of storing and shifting data stored in the data buffer, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the principal intention of the present invention is to maximize processing throughput by reducing the number of times access is required to the image memory to retrieve the data. The number of times access is required is reduced by shifting the image data in the buffer using a hardware mechanism attached to the data buffer so that multiple accesses to memory for the same image data are avoided.

It should be noted that while the discussion herein is directed to stereo image processing and generating a disparity map for distance calculations, the principles of the present invention may be adapted for use in, and provide benefit for, other applications of stereo image processing.

Furthermore, the hardware mechanism which shifts the data in the buffer may be of any such mechanisms known in the art. It should be further noted that the principles of the present invention are equally applicable across the full range of simultaneous image processing of multiple images. While the discussion herein is directed toward application of the present invention to stereo image processing, the principles of the present invention may be readily adapted for use with other types of processing as well.

Figure 1C:
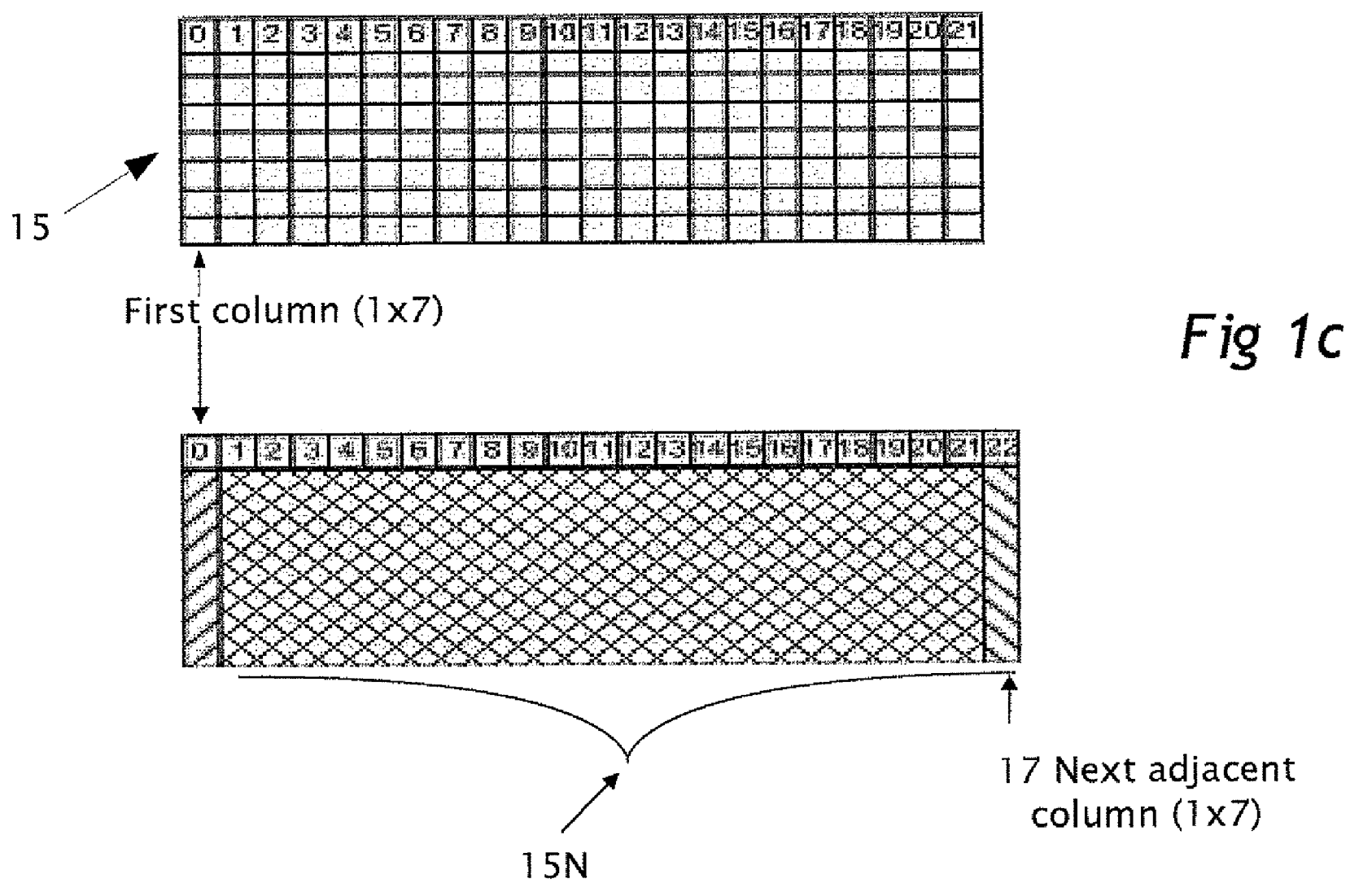

Referring now to the drawings, FIG. 1a illustrates two cameras 10A and 10B, respectively, imaging the same scene in a stereo imaging configuration. FIG. 1b shows, schematically, image 11A as stored in or downloaded from camera 10A and image 11B as stored in or downloaded from camera 10B. A first step in stereo image processing of images 11 is to compare or correlate images 11 to find image portions of the same objects in the scene. In order to proceed with the comparison between images 11, since lone pixels will not yield significant image correlation, a "patch" 13 of data consisting of, for example, 7×7 picture elements, or pixels, is used to put the center pixel of patch 13 into proper context. For the purposes of the present example, for a low-resolution image of 160×120, the greatest disparity expected in position of one object as seen by right camera 10B relative to left camera 10A is within 16 pixels. Thus, taking a patch 13 of 7×7 pixels in image 11A and performing a "find" operation on 16 adjacent patches in companion image 11B would require a data swath 15 to have 22×7 pixels. Since each patch 13 has a center pixel surrounded by a pixel frame of three pixels, 22 pixels are needed to contain the 16 pixels under consideration along with 3 pixels on the right and 3 pixels on the left.

Patch 13 of 7×7 and swath 22×7 and other parameters used are by way of example only and in other embodiments of the present invention, other patch size, swath size and other parameters may be used.

The present embodiment of the invention includes taking a patch 13 in image 11A (referred to herein as the "fixed image") and performing a "find" operation in a swath 15 including 16 patches of 7×7 pixels centered around 16 adjacent pixels in image fib (referred to herein as the "moving image" because the image processing step "moves" through image 11b). Patch 13 is compared with similar patches of 7×7 pixels in swath 15 by performing, for instance, a SAD (Sum Absolute Difference) operation, whereby each pixel in patch 13 is subtracted from the corresponding pixel in a patch within swath 15 of image 11b. The absolute value of the difference is then taken and the result of all the absolute differences for all pixels in the patch (e.g. 49 for 7×7 patches) is then summed, thus providing a "score" of the comparison. The closer the patches match, the closer the score will be to zero. Other operations would work as well, like sum of squared differences (e.g. SSD). The "find" operation for any given pixel in the fixed image will result in 16 scores corresponding to the 16 patches in swath 15 on which the comparison was performed. The best score is the minimum of the 16 scores, though algorithms other than "minimum" could be applied to determine a "best score". The patch comparison yielding the best score is considered a "match" and the disparity value (in number of pixels) associated with that particular match is then stored in memory. For example, if the third patch within the 16 patches has the best score then the disparity is 2 pixels (i.e., the first pixel patch corresponds to a disparity of 0 pixels). The patch matching, or "find", procedure is performed for every pixel in fixed image 11A, resulting in a disparity map containing a disparity value per pixel. The disparity map can then be processed by software to determine, for instance, the distance of objects from the cameras.

Assuming camera memory storage of 8-pixels/cell (i.e., for 8-bit pixels, each memory cell is 64-bits wide), in order to set up a 7×7 patch, a prior art circuit would perform a minimum of 7 separate memory reads (one per row) just to prepare one patch of data. Obviously 7 reads for one pixel patch is inefficient, since this would result in a processing rate of 1 pixel patch every 7 cycles. Furthermore, for patches not aligned to a memory cell, 2 reads per patch could be required, thus bringing the figure to 14 cycles/pixel. (Non-alignment results when one 7 pixel row needed does not reside in one 64-bit cell but rather spans across two adjacent memory cells of image memory).

Once a pixel-patch 13 has had its 16 SAD values calculated, the next 22×7 swath 15 is needed to run the "find" for the next adjacent fixed pixel-patch 13. For the fixed image buffer we need merely shift one pixel over to obtain the next adjacent patch 13; however the moving image buffer of the prior art needs to be "reloaded" with all the same data shifted by one. To support this need without having to reread the data from memory, the buffers are configured with a hardware mechanism or "feedback" between the columns of data to save shifted out data as well as a mechanism to perform multi-shifts of groups of column data in to their appropriate positions for the next cycle—thus "recycling" the data from the previous swath—and hence the title of the present application "Cyclical Image Buffer."

Reference is now made to FIG. 1c. Following the initial "find" operation on the first pixel patch and swath, the circuit advances to the next adjacent pixel patch in fixed image 11a for which a search is performed in 16 patches of the next swath 15N. What is noteworthy about "stereo" image processing is that all that is needed in data swath 15N is the same 22×7 pixels of the prior data swath 15 excluding the first column (1×7) which is no longer of interest and the last column (1×7) which is now to contain next adjacent column 17 of pixel data.

Reference is now made to FIG. 2 which shows a simplified block diagram of an image processing circuit according to an embodiment of the present invention. A data buffer stores patch 13 (or fixed data buffer 13) and another data buffer (or moving data buffer 15) stores swath 15. Data buffers 13 and 15 are attached to both a buffer controller 23 and to an image processor 25. The term "image processor" as used herein refers to the patch comparison processing hardware (e.g. the circuitry that performs the SAD operation). This hardware is then part of algorithm block which is implemented in hardware (e.g. ASIC) to be connected to a general purpose microprocessor or other hardware e.g. SoC (System on a Chip). Image data is fed into data buffers 13 and 15 via multiplexers 22a and 22b respectively, which are fed from pixel alignment unit 29a and 29b, that perform row alignment of images 11a and 11b if and when required. Pixel alignment unit 29a and 29b receive their data from input mechanism 27a and 27b respectively, which preferably includes two data latches fed from the memories of cameras 10A and 10B, respectively. The data from each camera memory is preferably double latched to allow for non-64 bit-aligned images stored in camera memory. Thus, two adjacent reads of the 64 bit memory cells of camera memory will then need to be aligned to one 64 bit data word to be latched into data buffers 13 and 15. The pixel alignment units 29a and 29b also preferably have a pass through mode when images 11a and 11b do not require alignment.

Multiplexers 22a and 22b select between the cameras 10A and 10B to allow for patch 13 (of fixed image 11A) and swath 15 (of moving image 11B) to have inputs from either camera 10A or 10B. Thus, image 11A from camera 10A may serve as the fixed image source, searching for matches in image 11B of camera 10B; or camera 10B can serve as the fixed image source while image 11A of camera 10A is used to search for matches.

The next adjacent column 17 of the next adjacent pixel data swath 15N is stored in a next end pixel (NEP) buffer 17B. Similarly for fixed buffer 13 storing a 7×7 patch, a 1×7 column buffer for the next patch is stored in a next end pixel (NEP) buffer 17A. In an enhanced mode of operation, fixed buffer 13 stores eight columns of 7 pixels, moving buffer 15 stores 23 columns of 7 pixels (using NEP 17B to initially hold the one extra pixel column); NEP 17A and 17B each store two columns of 7 pixels to have the next adjacent data ready for the following "find" operation.

Figure 3:
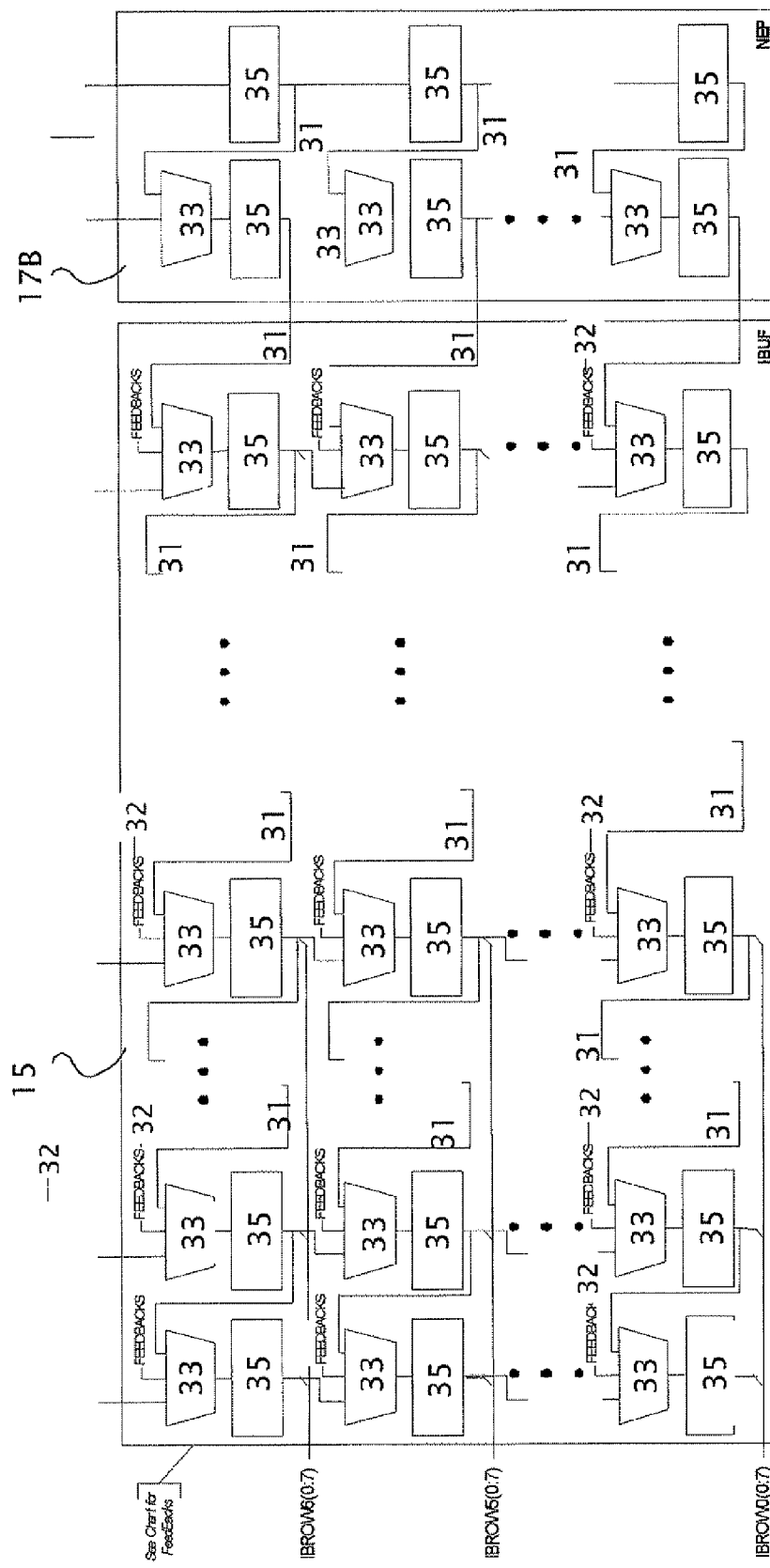
FIG. 3 is a simplified schematic diagram of a storage buffer with feedback between columns of data, and feed forward between rows, according to an embodiment of the present invention.

Reference is now made to FIG. 3, which shows in more detail the construction of moving data buffer 15 and NEP buffer 17B. Each register element of data buffer 15 and associated NEP buffer 17B is fed by outputs of digital multiplexers 33. One of the inputs of multiplexers 33 is from a previous row of buffers 15, such that each element 35 is optionally input by element 35 above in the same column and previous row. Buffers 15 and 17B are as such, built in a "shift down" architecture thus reducing the fan-out of the driving logic. Another "shift forward" input 31 of digital multiplexers 33 is attached to element 35 from the next column in buffers 15 and 17B and in the same row. The last column of moving buffer 15 and the first (or only) column of NEP buffer 17B are similarly attached with inputs 31. When NEP buffer 17B includes two columns, as shown in FIG. 3, the two columns are similarly connected. Finally, multiplexers 33 include inputs (labeled "FEEDBACKS 32") which serve to implement the several hardwired shifts (multi-shifts) that are required on the $16^{th}$ cycle to move all the saved pixels to the appropriate positions in the buffer before beginning of the find process of the next swath.

Regular Mode Operation

Figure 4:
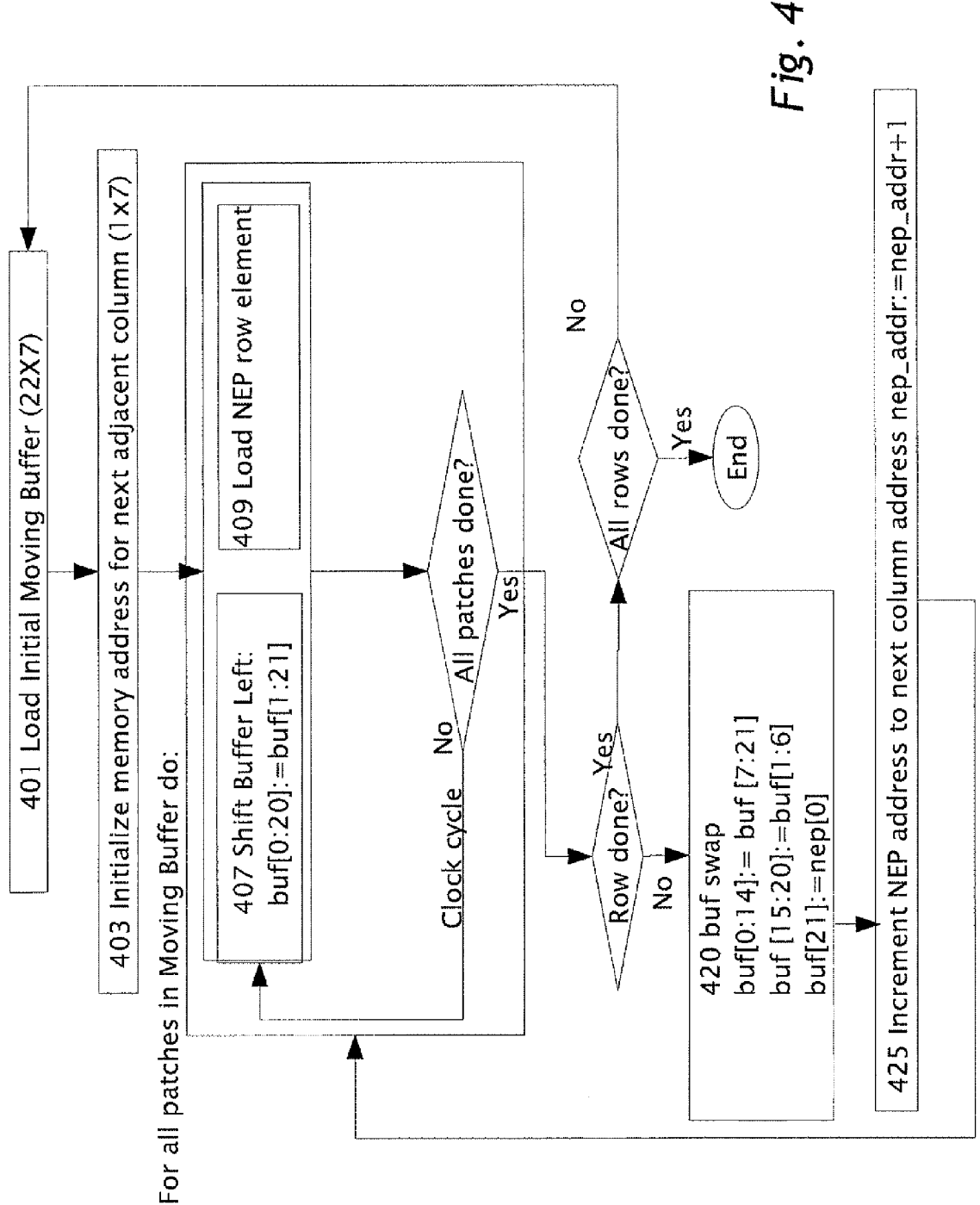
FIG. 4 is a flow diagram of a regular mode of operation of the system of FIG. 2, according to an embodiment of the present invention.
Figure 5A:
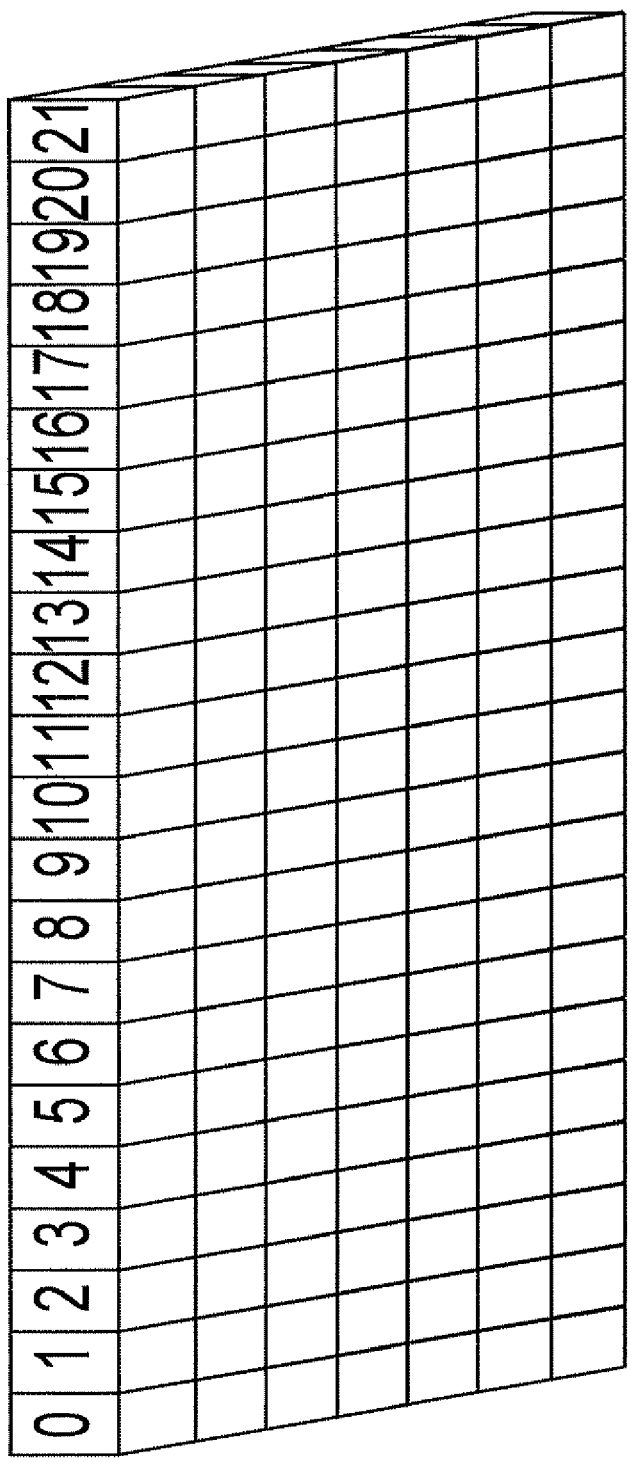
FIG. 5A is an illustration in perspective of a swath of data (22×7), and respective column labels, according to the embodiments of the present invention.
Figure 5B:
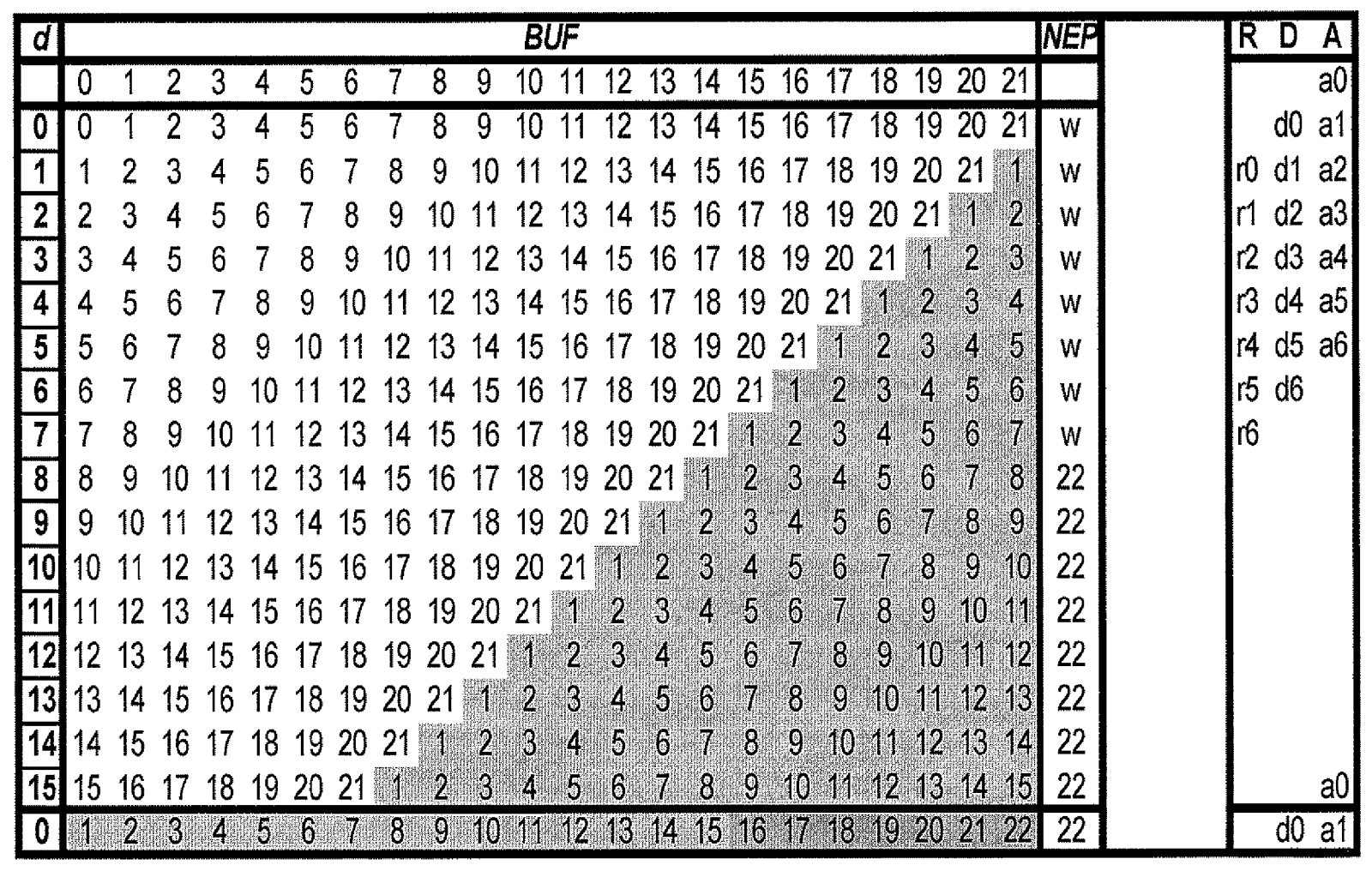

According to a mode of operation (referred to herein as a "regular mode") of the present invention, a new 7×7 patch stored in fixed buffer 13 from fixed image 11A is supplied every 16 clock cycles, while moving image 11B supplies a new 7×7 patch from swath 15 every clock cycle. Reference is now made to FIG. 4 which illustrates a flow diagram of the regular mode of operation for the moving buffer. An initial 7×7 patch from image 11A is loaded into fixed buffer 13. An initial data swath from image 11B is loaded (step 401) into moving buffer 15. Moving buffer 15 now stores the current 22 pixel columns to calculate the 16 SAD values for current patch 13. Reference is now also made to FIG. 5 which illustrates the content and shifting of data within moving buffer 15, according to embodiments of the present invention. FIG. 5A illustrates 22 1×7 columns of data as stored in moving buffer 15. Columns are labeled with numbers 0 through 21. Each column label (0-21) refers to a column of data, in this case, with seven row elements in each column. FIG. 5B illustrates a memory map of moving buffer 15 for each clock cycle of the regular mode of operation. Column "d" indicates system clock cycles. Sixteen clock cycle rows are labeled with clock cycles 0-15. The number labels from 0 to 21 under BUF each represent the column of 7 row elements of data as shown in perspective in FIG. 5A. For each clock cycle, the pixels are shifted left (step 407) 1 pixel every clock, with the second column (i.e., buf[1]) of moving buffer 15 being "fed-back" to the final column. (i.e., buf[21]) of moving buffer 15.

In the mean time, after moving buffer 15 is initialized (step 401), the memory address for the next adjacent column of data (needed for the upcoming swath) is initialized (step 403). NEP buffer 17B of 1×7 data elements is updated (step 409), one row element per clock cycle so that NEP buffer 17B becomes valid on the eighth clock cycle. FIG. 5B, as shown in the columns labeled "R,D,A", illustrates how NEP buffer 17B doesn't become valid till 8 clock cycles after the start. The "A" column represents the "Address" being sent to the memory, the "D" column shows the "Data" being read, and the "R" column displays the data "Registered" before it is then latched into NEP buffer 17B. NEP buffer 17B is shown with "w" indicating that it is "waiting" for the full 1×7 data, the "22" then indicating that the full column for pixel column 22 has been latched into NEP buffer 17B.

Patch count of moving buffer 15 is incremented until the last of the 16 patches has been shifted left (step 407) and processed (e.g. SAD processing not shown in FIG. 4). When all the 16 patches of the swath are processed, then in one clock cycle (step 420) the following occurs simultaneously:
buffer columns 7-21, are shifted in one step (i.e., there is a hardwired shift left of seven) to columns 1-14;
buffer columns 16-21, currently in buffer slots 1-6, are fed-back (i.e., there is a hardwired shift right of fourteen) to slots 15-20; and
the "new end pixel" column in NEP buffer 17B is shifted left one into buffer 15 column 21.

These hardwired shifts are indicated in FIG. 3 by multiplexers 33 inputs labeled "FEEDBACKS 32".

In the mean time, after moving buffer 15 has now been readied (step 420), the memory address for the next adjacent column of data (needed for the upcoming swath) is incremented (step 425). When the end of a row is reached in images 11, the operation continues at the beginning of the next row (returning to step 401). When all the rows are processed the image processing is complete and the complete disparity map is output.

Enhanced Mode Operation

Figure 5C:
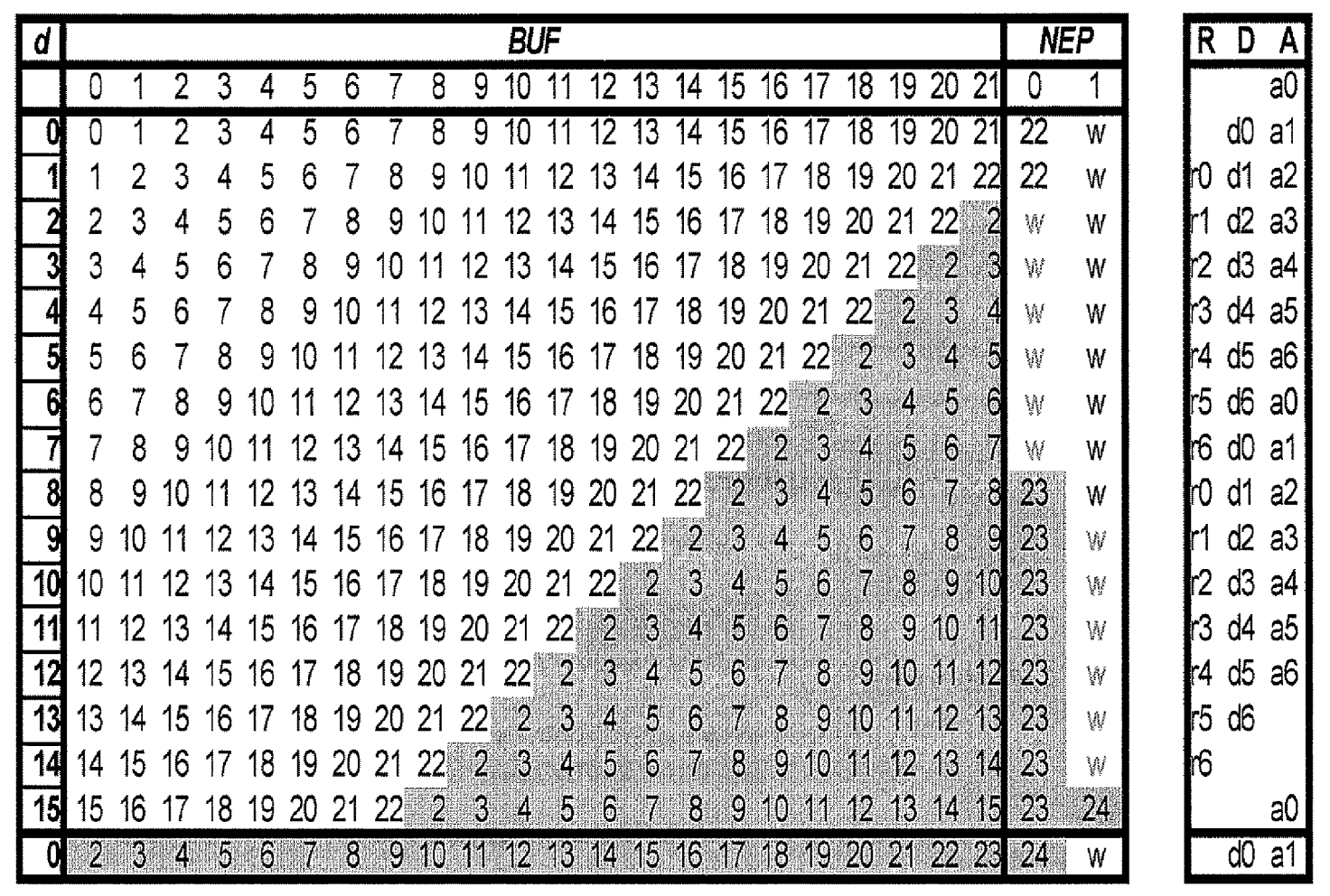

By employing a modification to the hardware, the throughput of the regular mode of operation may be doubled. Specifically, another column buffer may be added to NEP buffers 17A and 17B with a "shift forward" 31 link between the two columns of NEP buffer 17A and 17B. Then two pixel patch "finds" are performed on two adjacent 16-pixel swaths 15, thus effectively doubling the throughput of the regular mode of operation. Reference is now made to FIG. 5C, which maps the moving buffer during the clock cycles of the enhanced mode of operation. Since the system is performing "finds" on two fixed pixel-patches, moving buffer 15 needs to store 23 pixel columns: 0-21 for the first pixel-patch find and 1-22 for the second pixel-patch find. The first column of the NEP (i.e. NEP0) is preferably used to extend moving buffer 15 and temporarily hold the extra pixel column.

Like the regular mode, the pixels are shifted left (as in step 407) by 1 pixel every clock. However, unlike the regular mode, where pixel columns 1-21 are fed back to the end of moving buffer 15 to be saved for the next swath find, in enhanced mode, the next two swaths needed will be of pixel columns 2-23, and 3-24. Due to these constraints, the first clock cycle that performs a shift left by 1, will include shifting in the last pixel column of the current double swath, presently in NEP0.

Following this, NEP0 and NEP1 are then filled with the two next end pixel columns of the upcoming swaths. This will take 16 cycles, 7 cycles for each of the 7 rows per NEP column, plus 1 cycle for the registering of the memory output and 1 cycle for registering of the data into the NEP buffer, thus using the full available 16 cycles till the data must be ready for the next pixel patch finds (as can be seen in the RDA columns of the chart in 1.2.2). It should be noted that the double registering for pixel alignment mentioned previously and shown in FIG. 2 registers 27b are only necessary for swath initialization, the NEP column always being within a given 64b memory cell and thus only one register element is used with pixel alignment unit 29b set to pass-through.

Upon every clock cycle of cycles 1-14, the pixels are shifted left by one pixel, while at the same time readying the moving buffer 15 for the next swats by feeding the pixels in column number 1 back to column number 21 (just as was done in the regular mode, only here the feedback starts on cycle 1 as opposed to starting on cycle 0—compare FIGS. 5B and 5C). This continues until the last of the 16 patches has been processed at which time pixel columns 8-21 which currently contain pixel columns 2-15, respectively, are shifted forward by 8 in one action (i.e., moving buffer 15 contains a hardwired shift-left of 8). At the same time, upon the 16th clock, pixel columns 1-7, which currently contain pixel columns 16-22, respectively, are fed-back to pixel columns slots 14-20 (again, moving buffer 15 is hardwired for this operation). And simultaneously, the "new end pixel columns" in the NEP buffer are shifted left into pixel column slots 21 and NEP0. All this is done for all 7 rows in one clock cycle. Once the new pixels have begun their 16 clock calculations, the NEP is again filled with the next end pixel columns.

While the invention has been described with respect to a limited number of embodiments, it will be appreciated that many variations, modifications and other applications of the invention may be made.

What is claimed is:

1. In a system including an image processor attached to a storage buffer wherein the storage buffer includes a plurality of n columns of data, said columns numbered from zero to N, wherein N is greater than 1, a method for comparison between first image data and second image data, the method comprising the steps of:
   (a) comparing a patch of the first image data to a swath of the second image data, the storage buffer storing the swath of the second image data; and
   (b) during said comparing, shifting of said swath using a hardware mechanism within the storage buffer, wherein said shifting includes upon each clock cycle of the processor:
      (i) moving the data stored in column one into column N; and
      (ii) moving the data stored in each of the n columns from column n into column n−1.

2. The method according to claim 1, wherein the storage buffer includes a plurality of columns of data, said columns numbered from zero to N, wherein for said patch said comparing to said swath is performed M times, wherein M is less than N, further comprising the step of:
   (c) upon completing said comparing to said swath, moving at least N−M+1 columns of data in a single step.

3. The method according to claim 1, further comprising the step of:
   (c) upon completing said comparing to said swath, second shifting into the storage buffer a portion of the second image data, wherein said second shifting is performed from a second storage buffer using a second hardware mechanism into the storage buffer thereby completing a second swath in the storage buffer.

4. The method according to claim 3, wherein said second storage buffer includes no more than two columns of second image data, the height of said columns being equal to the height of said swath.

5. A storage buffer attached to a processor, wherein the processor compares a first image and a second image, the storage buffer storing image data of the second image, wherein the storage buffer includes a plurality of n columns of data, said columns numbered from zero to N, wherein N is greater than 1, the storage buffer comprising:

(a) a data-shifting-hardware mechanism which while the processor compares a patch of the first image to a swath of the second image, the data shifting mechanism using hardware within the storage buffer shifts at least a portion of the swath within the storage buffer wherein said data-shifting-hardware mechanism which upon each clock cycle of the processor:

(i) moves the data stored in column one into column N; and
(ii) moves the data stored in each of the n columns from column n into column n−1.

6. The storage buffer of claim 5, wherein the data-shifting hardware mechanism includes a plurality of digital multiplexers with respective selectable inputs from adjacent columns of data within the storage buffer.

7. The storage buffer of claim 6, wherein said digital multiplexers include a plurality of respective selectable inputs from adjacent rows of data within the storage buffer.

8. The storage buffer of claim 6, wherein said digital multiplexers include a plurality of respective selectable inputs from at least one non-adjacent columns of data within the storage buffer.

* * * * *